United States Patent
Kim et al.

(10) Patent No.: US 9,927,914 B2
(45) Date of Patent: Mar. 27, 2018

(54) DIGITAL DEVICE AND CONTROL METHOD THEREOF

(71) Applicant: LG ELECTRONICS INC., Seoul (KR)

(72) Inventors: Jihwan Kim, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 790 days.

(21) Appl. No.: 14/168,455

(22) Filed: Jan. 30, 2014

(65) Prior Publication Data

US 2015/0091877 A1 Apr. 2, 2015

(30) Foreign Application Priority Data

Sep. 30, 2013 (KR) ........................ 10-2013-0116199

(51) Int. Cl.
*G06F 3/041* (2006.01)
*G06F 3/0488* (2013.01)

(52) U.S. Cl.
CPC .......... *G06F 3/0418* (2013.01); *G06F 3/0488* (2013.01)

(58) Field of Classification Search
CPC ....... G06F 3/0418; G06F 3/045; G06F 3/0488
See application file for complete search history.

(56) References Cited

U.S. PATENT DOCUMENTS

| 2010/0099464 | A1* | 4/2010 | Kim | G06F 1/1615 |
| | | | | 455/566 |
| 2010/0164904 | A1* | 7/2010 | Kim | G06F 3/038 |
| | | | | 345/174 |
| 2010/0188353 | A1* | 7/2010 | Yoon | G06F 3/04883 |
| | | | | 345/173 |
| 2010/0277439 | A1* | 11/2010 | Charlier | G06F 1/1616 |
| | | | | 345/176 |
| 2011/0157053 | A1 | 6/2011 | Webb et al. | |
| 2012/0011438 | A1 | 1/2012 | Kim et al. | |

(Continued)

FOREIGN PATENT DOCUMENTS

| EP | 2302488 A2 | 3/2011 |
| EP | 2 341 418 A1 | 7/2011 |
| KR | 10-2012-0006187 A | 1/2012 |

*Primary Examiner* — Alexander Eisen
*Assistant Examiner* — Mansour M Said
(74) *Attorney, Agent, or Firm* — Birch, Stewart, Kolasch & Birch, LLP

(57) ABSTRACT

Disclosed is a double-sided touch recognition digital device. The digital device includes a display unit to display a visual object, a front-side touch sensor unit to sense a touch input on a front side of the device, a rear-side touch sensor unit to sense a touch input on a rear side of the device, and a processor to control the display unit and the front-side and rear-side touch sensor units. The processor obtains a first reference position and second touch position on the front-side or rear-side touch sensor unit, obtains a distance between the first reference position and the second touch position, and determines whether or not the distance between the first reference position and the second touch position is within a valid recognition distance. The valid recognition distance for the rear-side touch sensor unit is longer than the valid recognition distance for the front-side touch sensor unit.

18 Claims, 10 Drawing Sheets

(56) References Cited

U.S. PATENT DOCUMENTS

2012/0110447 A1* 5/2012 Chen .................... G06F 1/1626
                                                715/702
2012/0174044 A1* 7/2012 Koga .................. G06F 3/04883
                                                715/863
2013/0181930 A1   7/2013 Imada et al.

* cited by examiner

Front side    Rear side

Front side    Rear side

Rear side         Front side

Front-side touch　　　　　Rear-side touch

Front-side touch　　　　　Rear-side touch

Front-side touch

Rear-side touch

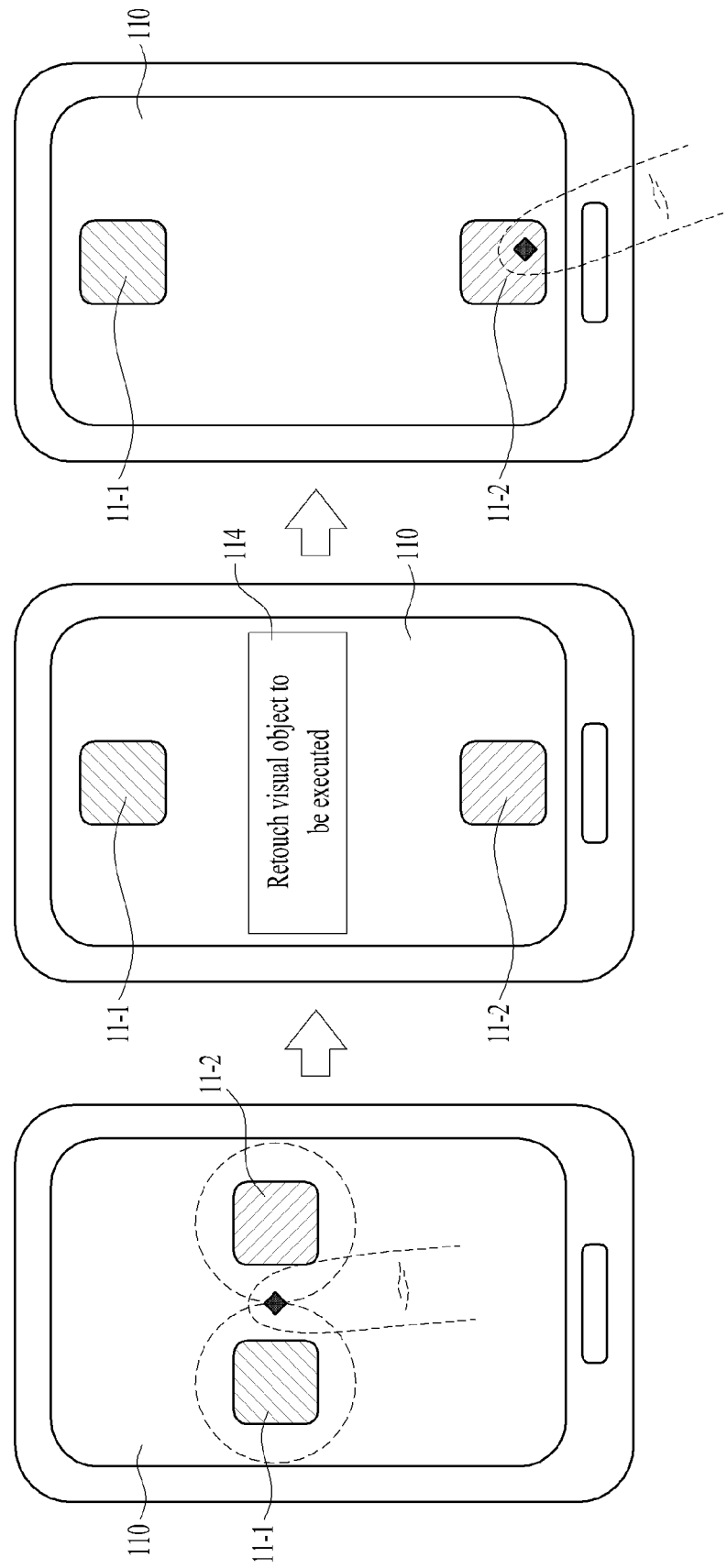

Front-side touch        Rear-side touch

DIGITAL DEVICE AND CONTROL METHOD THEREOF

Pursuant to 35 U.S.C. § 119(a), this application claims the benefit of Korean Patent Application No. 10-2013-0116199, filed on, Sep. 30, 2013, which is hereby incorporated by reference as if fully set forth herein.

BACKGROUND OF THE INVENTION

Field of the Invention

The present disclosure relates to a digital device, and more particularly to a double-sided touch sensitive digital device.

Discussion of the Related Art

As technology develops, use of touch sensitive digital devices, such as smart-phones, tablet PCs, etc., is gradually increasing. Moreover, in recent years, use of double-sided touch sensitive digital devices, which may control operation of a device using a front-side touch as well as a rear-side touch, is increasing.

With regard to such double-sided touch sensitive digital devices, however, controlling operation of a device using a rear-side touch may cause a touch error, differently from a front-side touch that allows a user to directly observe a touch gesture.

SUMMARY OF THE INVENTION

Accordingly, the present disclosure is directed to a digital device and a control method thereof that substantially obviate one or more problems due to limitations and disadvantages of the related art.

An object of the present disclosure is to provide a digital device in which a valid recognition distance for recognition of a valid front-side touch and a valid recognition distance for recognition of a valid rear-side touch are differently set from each other in order to correct a touch error that is encountered upon touching a rear side of the device.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a digital device according to one embodiment includes a display unit configured to display at least one visual object, a front-side touch sensor unit configured to sense a touch input on a front side of the digital device, a rear-side touch sensor unit configured to sense a touch input on a rear side of the digital device, and a processor configured to control the display unit, the front-side touch sensor unit, and the rear-side touch sensor unit, wherein the processor is further configured to obtain a first reference position and a second touch position on the front-side touch sensor unit or the rear-side touch sensor unit, obtain a distance between the first reference position and the second touch position, and determine whether or not the distance between the first reference position and the second touch position is within a valid recognition distance, wherein a valid recognition distance with respect to the rear-side touch sensor unit is longer than a valid recognition distance with respect to the front-side touch sensor unit.

Further, a digital device according to another embodiment includes a display unit configured to display a visual object, a front-side touch sensor unit configured to sense a touch input on a front side of the digital device, a rear-side touch sensor unit configured to sense a touch input on a rear side of the digital device, and a processor configured to control the display unit, the front-side touch sensor unit, and the rear-side touch sensor unit, wherein the processor is further configured to recognize a first touch and a second touch, obtained via one touch sensor unit among the front-side touch sensor unit or the rear-side touch sensor unit, as a single double-touch gesture or as separate touch inputs according to position and time of the first touch and the second touch, wherein if a distance between positions of the first touch and the second touch is within a valid recognition distance and a time interval between the first touch and the second touch is within a valid recognition time interval recognize a first touch and a second touch as the single double-touch gesture, wherein a valid recognition distance with respect to the rear-side touch sensor unit is longer than a valid recognition distance with respect to the front-side touch sensor unit.

Furthermore, a control method of a digital device according to a further embodiment includes obtaining a first reference position and a second touch position on a front-side touch sensor unit or a rear-side touch sensor unit, obtaining a distance between the first reference position and the second touch position, and determining whether or not the distance between the first reference position and the second touch position is within a valid recognition distance, wherein a valid recognition distance with respect to the rear-side touch sensor unit is longer than a valid recognition distance with respect to the front-side touch sensor unit.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 6A to 6C are views showing a digital device which is configured to recognize a touch input to any one of a plurality of visual objects according to an embodiment of the present specification;

DETAILED DESCRIPTION OF THE INVENTION

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

Moreover, although the embodiments will be described herein in detail with reference to the accompanying drawings and content described in the accompanying drawings, it should be understood that the disclosure is not limited to or restricted by the embodiments.

The present disclosure relates to a digital device. In the present disclosure, the digital device refers to an electronic device that enables image display and double-sided touch recognition. For instance, the digital device may be a smart-phone, a smart-pad, a Personal Digital Assistant (PDA), a laptop computer, a tablet PC, a smart-table, or a Head Mounted Display (HMD).

Figure 1:
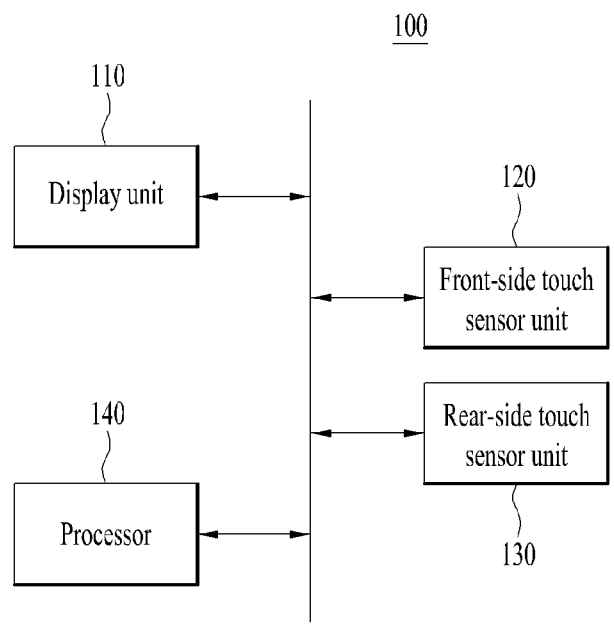
FIG. 1 is a block diagram showing a digital device according to an embodiment of the present specification.

FIG. 1 is a block diagram showing a digital device according to an embodiment of the present specification.

Referring to FIG. 1, the digital device 100 may include a display unit 110, a front-side touch sensor unit 120, a rear-side touch sensor unit 130, and a processor 140.

The display unit 110 may display an image on a display screen. More specifically, the display unit 110 may display an image on a display screen based on a control instruction of the processor 140.

In one embodiment, the display unit 110 may be a one-sided display unit including a single display screen at a front side or rear side of the digital device 100. In another embodiment, the display unit 110 may be a double-sided display unit including a plurality of display screens at a front side and a rear side of the digital device 100. In another embodiment, the display unit 110 may be a flexible display unit including a bendable display screen. In a further embodiment, the display unit 110 may be a foldable display unit including a foldable display screen.

In the present disclosure, the display unit 110 may display at least one visual object on a display screen. In the present disclosure, the visual object is a visually perceptible object, and refers to an object that requires a user touch input in order to execute a corresponding application or function. That is, when a user touch input to a visual object is recognized, the digital device 100 may execute an application or function corresponding to the visual object at which the touch input is recognized.

Next, each of the front-side touch sensor unit 120 and the rear-side touch sensor unit 130 may detect a user touch input on a front side and a rear side of the digital device 100. More specifically, each of the front-side touch sensor unit 120 and the rear-side touch sensor unit 130 may detect a user touch input on a front side and a rear side of the digital device 100 using a front-side touch sensor and a rear-side touch sensor individually mounted to the digital device 100, and transmit a detected result to the processor 140. The front-side touch sensor unit 120 and the rear-side touch sensor unit 130 may be a single touch sensor unit using a single touch sensor mounted to the digital device 100. In the following description, the front-side touch sensor unit may be referred to simply as a front-side sensor unit, and the rear-side touch sensor unit may be referred to simply as a rear-side sensor unit.

The processor 140 may execute various applications, and process internal data of the device 100. In addition, the processor 140 may control the aforementioned respective units of the digital device 100 as well as transmission/reception of data between the units.

In the present disclosure, the processor 140 may obtain a first reference position and a second touch position on a single sensor unit among the front-side touch sensor unit 120 or the rear-side touch sensor unit 130. Here, the first reference position may be a first touch position or a visual object position. In addition, the processor 140 may obtain a distance between the first reference position and the second touch position. Then, the processor 140 may determine whether or not the distance between the first reference position and the second touch position is within a valid recognition distance. A more detailed description of the processor 140 will follow with reference to the accompanying drawings.

In FIG. 1 as a block diagram of the digital device 100 according to an embodiment, separately shown blocks logically distinguish elements of the device. Accordingly, the elements of the above-described device may be mounted as a single chip or a plurality of chips based on device design. In addition, the digital device 100 of FIG. 1 corresponds to one embodiment, and does not require all of the elements shown in FIG. 1 to implement the embodiments of the present disclosure. Hereinafter, elements required by the embodiments of the present disclosure and operations thereof will be described in detail.

Figure 2A:
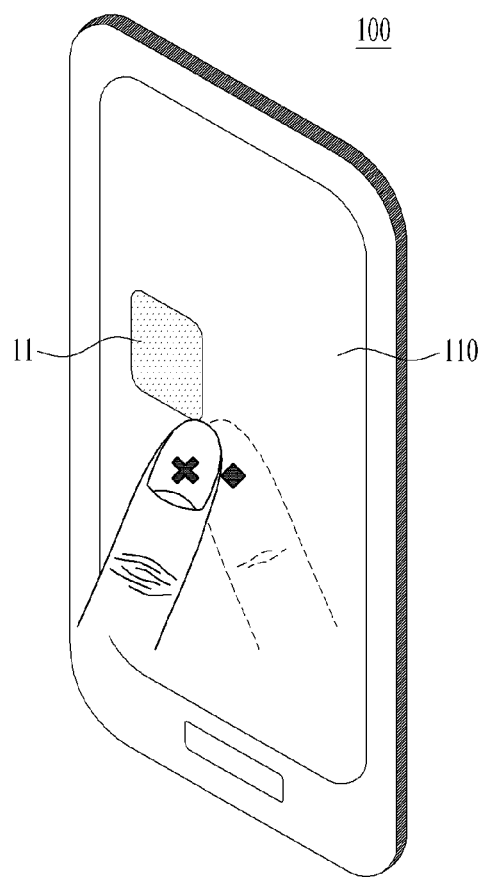
FIGS. 2A to 2C are views showing a digital device according to an embodiment of the present specification.
Figure 2B:
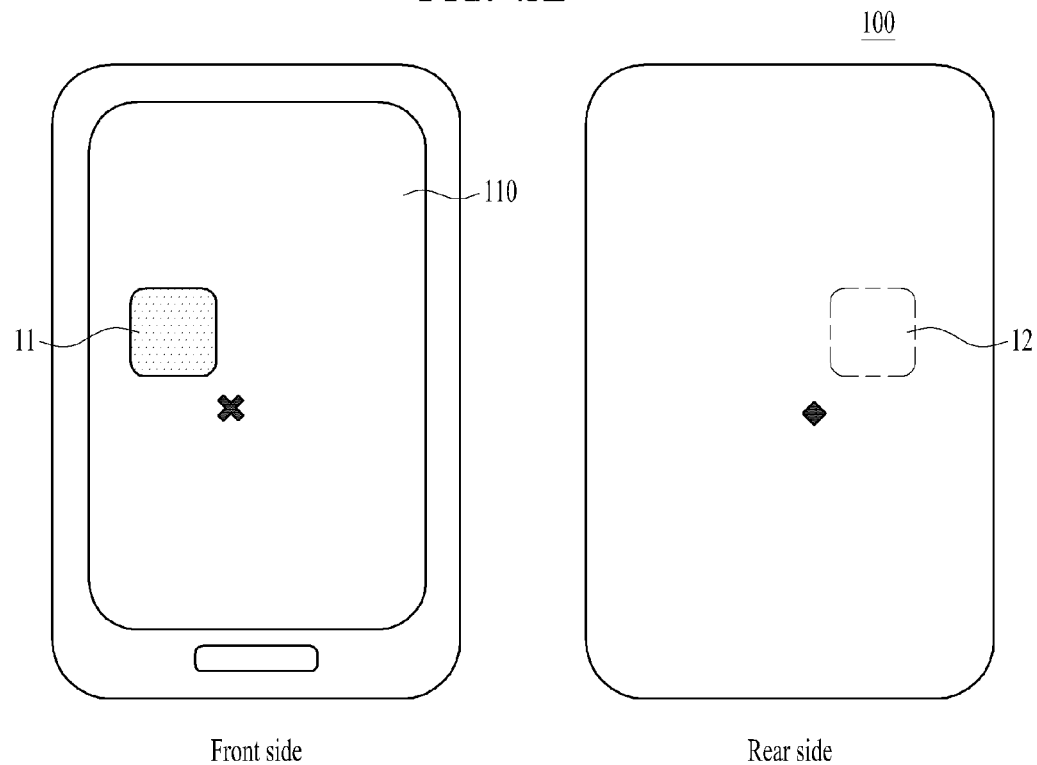
Figure 2C:
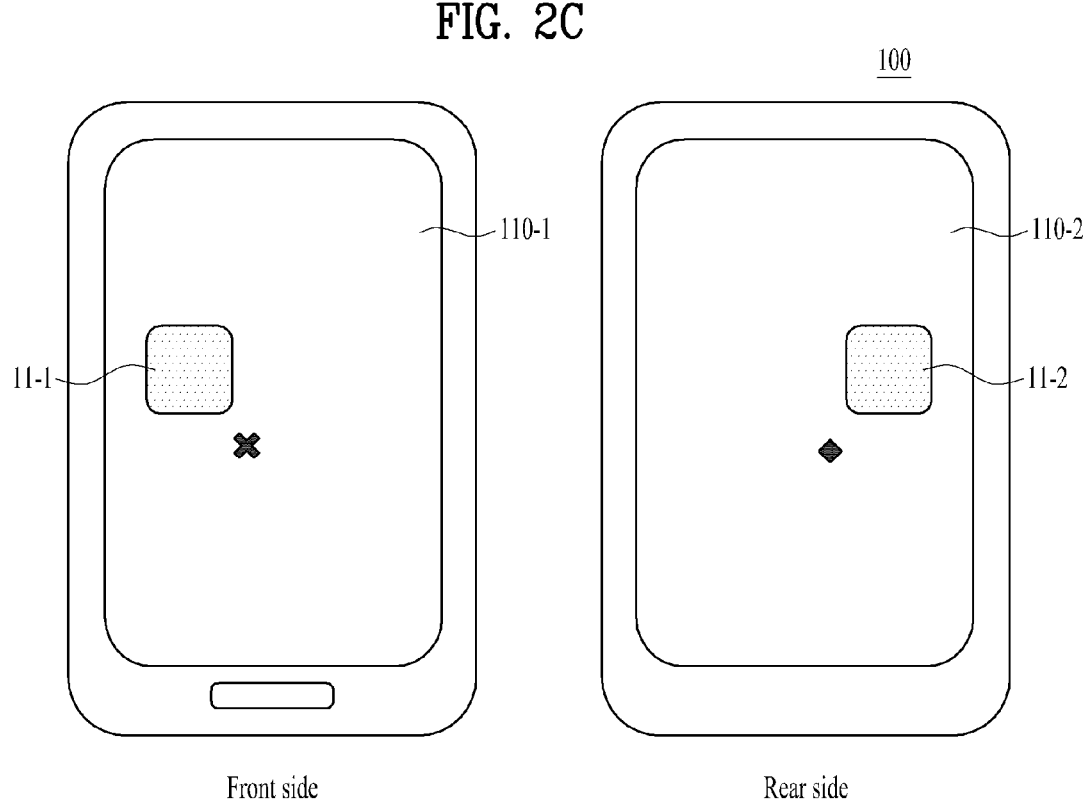

FIGS. 2A to 2C are views showing a digital device according to an embodiment of the present specification.

More specifically, FIG. 2A shows a digital device which is configured to recognize a touch input on a front side and a rear side thereof, FIG. 2B shows a digital device including an one-sided display unit which is configured to recognize a touch input on a front side and a rear side thereof, and FIG. 2C shows a digital device including a double-sided display unit which is configured to recognize a touch input on a front side and a rear side thereof.

Referring to FIG. 2A, the digital device 100 may display a visual object 11 using the display unit 110 provided at a front side of the device 100. In addition, the digital device 100 may recognize a touch input on a front side or rear side of the device 100 using a front-side or rear-side touch sensor unit.

Referring to FIG. 2B, the digital device 100 may display the visual object 11 using the front-side display unit 110. In addition, the digital device 100 may set a touch region 12, corresponding to the visual object 11 displayed on the front side thereof, within a rear-side touch recognition region. As such, the digital device 100 may execute an application or function corresponding to the visual object 11 if a touch input to the visual object 11 displayed at the front side is recognized as well as if a touch input to the touch region 12 set at the rear side is recognized.

Referring to FIG. 2C, the digital device 100 may display a first visual object 11-1 using a front-side display unit 110-1. In addition, the digital device 100 may display a second visual object 11-2 corresponding to the first visual object 11-1 using a rear-side display unit 110-2. Here, the first visual object 11-1 and the second visual object 11-2 may correspond to the same application or function. That is, the digital device 100 may execute the same application or function if a user touch input to the first visual object 11-1 is recognized or if a user touch input to the second visual object 11-2 is recognized. In an embodiment, the rear-side display unit 110-2 may display the second visual object 11-2 corresponding to the first visual object 11-1 only when a user gaze is detected via a sensor unit.

Figure 3A:
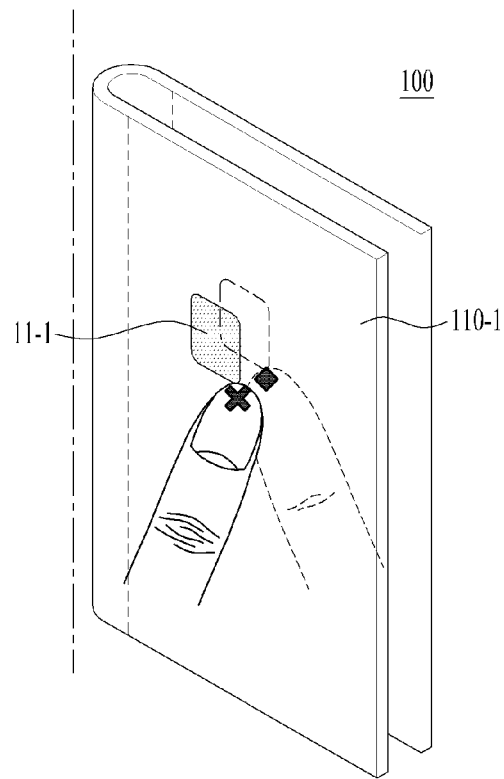
FIGS. 3A and 3B are views showing a digital device according to another embodiment of the present specification.
Figure 3B:
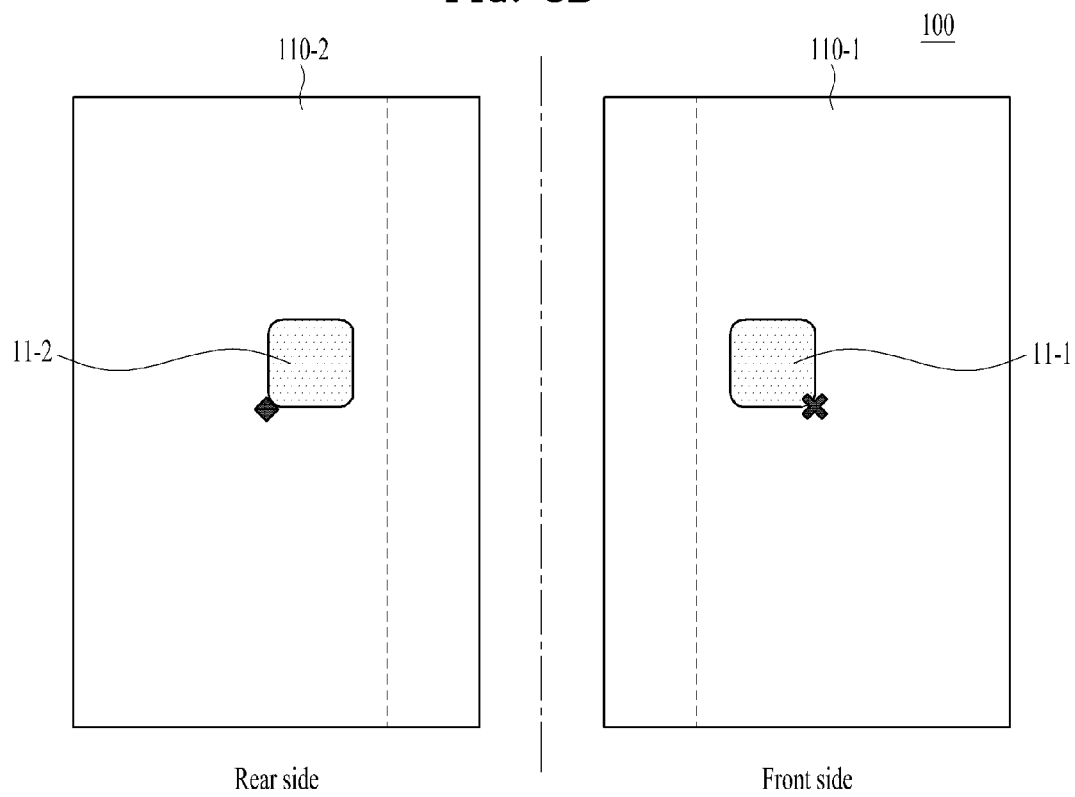

FIGS. 3A and 3B are views showing a digital device according to another embodiment of the present specification.

More specifically, FIG. 3A shows a digital device including a flexible or foldable display unit which is configured to recognize a user touch input on a front side and a rear side thereof, and FIG. 3B shows an unfolded state of the digital device including the flexible or foldable display unit.

Figure 4:
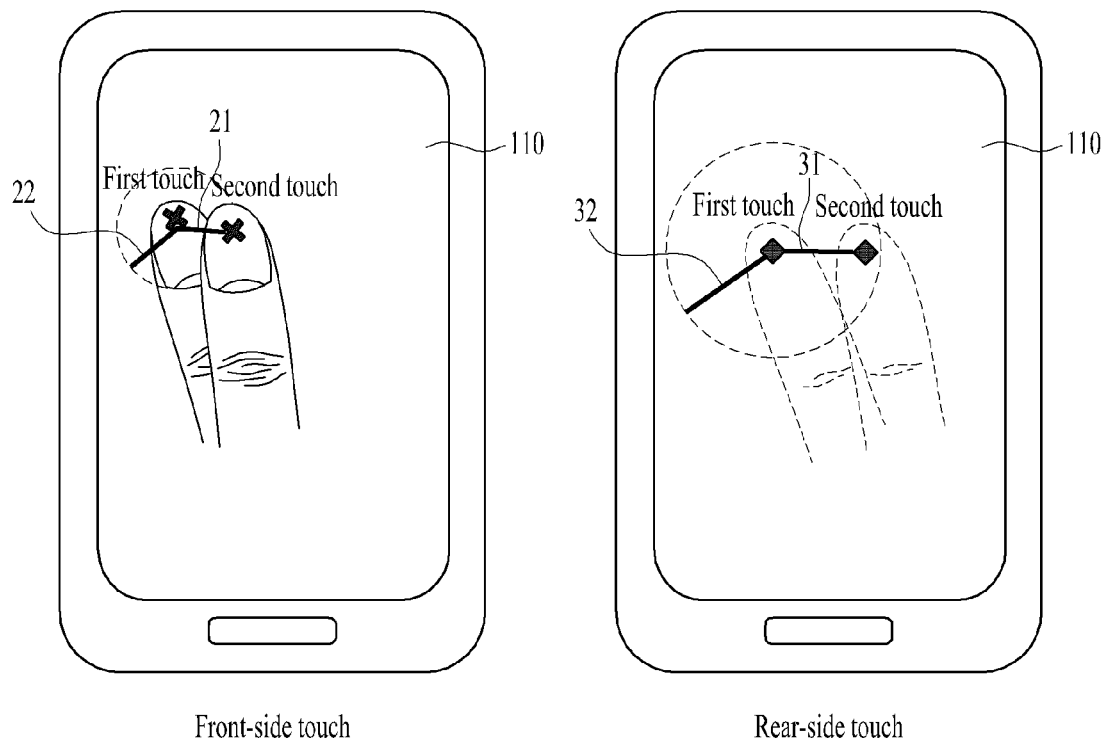
FIG. 4 is a view showing a digital device which is configured to recognize two touch inputs on a front side or a rear side of a device according to an embodiment of the present specification.

Referring to FIGS. 3A and 3B, the digital device 100 may display the first visual object 11-1 using the front-side display unit 110-1. In addition, the digital device 100 may display the second visual object 11-2, corresponding to the first visual object 11-1, using the rear-side display unit 110-2. Here, the front-side display unit 110-1 and the rear-side display unit 110-2 may be connected to each other to constitute a single flexible or foldable display unit. As described above, the first visual object 11-1 and the second visual object 11-2 may correspond to the same application or function. That is, the digital device 100 may execute the same application or function if a touch input to the first visual object 11-1 is recognized or if a touch input to the second visual object 11-2 is recognized. FIG. 4 is a view showing a digital device which is configured to recognize two touch inputs on a front side or a rear side of the device according to an embodiment of the present specification. That is, FIG. 4 shows an embodiment in which a first reference position is a first touch position.

Hereinafter, the present embodiment will be described in detail based on operation of the processor.

Referring to FIG. 4, if a first touch input and a second touch input on a front-side touch sensor unit are sensed or a first touch input and a second touch input on a rear-side touch sensor unit, the processor may obtain a first touch position and a second touch position using sensed results. Here, the first touch position may be touch coordinate recognized from the first touch input and the second touch position may be touch coordinate recognized from the second touch input.

Moreover, if the first touch input and the second touch input on a front-side touch sensor unit are sensed or the first touch input and the second touch input on the rear-side touch sensor unit, the processor may additionally obtain a first touch area and a second touch area using sensed results, and may determine whether or not each of the first touch area and the second touch area is an area-threshold or more. In this case, an area-threshold with respect to the rear-side touch sensor unit may be set to be greater than an area-threshold with respect to the front-side touch sensor unit. In addition, if each of the first touch area and the second touch area is the area-threshold or more, the processor may recognize each of the first touch input and the second touch input as a valid touch input.

In addition, the processor may obtain a distance 21 or 31 between a first touch position and a second touch position, and determine whether or not the obtained distance 21 or 31 between the first touch position and the second touch position is within a valid recognition distance 22 or 32. In the following description, the distance 21 or 31 between the first touch position and the second touch position may be referred to as a double-touch distance.

Here, the valid recognition distance refers to a maximum distance required to recognize two touches as a single valid double-touch gesture. That is, if the double-touch distance is within a valid recognition distance, the processor may recognize two touches as a single valid double-touch gesture. The valid recognition distance may be set upon manufacture of the digital device, or may be set by the user. In this case, as exemplarily shown in FIG. 4, the valid recognition distance 32 with respect to the rear-side touch sensor unit may be set to be longer than the valid recognition distance 22 with respect to the front-side touch sensor unit. In this way, it is possible to correct a touch error caused when the user touches the rear side of the device while maintaining the user gaze at the front side of the device. Although FIG. 4 shows that whether or not the double-touch distance is within a valid recognition distance is determined based on the first touch position, whether or not the double-touch distance is within a valid recognition distance may be determined based on the second touch position.

If the double-touch distance is within a valid recognition distance, the processor may recognize a first touch and a second touch as a single double-touch gesture, the first touch being recognized as a first touch position and the second touch being recognized as a second touch position. In addition, if the double-touch distance is outside the valid recognition distance, the processor may recognize the first touch and the second touch as separate touch inputs.

If the first touch and the second touch are recognized as a single double-touch gesture, the processor may provide at least one feedback among a visual feedback, an audio feedback, or a tactile feedback. In one example, the processor may provide a text message, such as "double-touch gesture recognition", as a visual feedback using a display unit, and the user may visually perceive the visual feedback. In another example, the processor may provide an audio message, such as "double-touch gesture recognition", as an audio feedback using a speaker unit, and the user may audibly perceive the audio feedback. In a further example, the processor may provide micro vibration as a tactile feedback using a micro vibration actuator, and the user may perceive the tactile feedback via tactile perception.

In summary, if the double-touch distance 21 with respect to the front-side touch sensor unit is within the valid recognition distance 22 as exemplarily shown in the left part of FIG. 4, the processor may recognize two touches on the front side of the device as a valid double-touch gesture, and provide the user with a feedback. Or if the double-touch distance 31 with respect to the rear-side touch sensor unit is within the valid recognition distance 32 as exemplarily shown in the right part of FIG. 4, the processor may recognize two touches on the rear side of the device as a valid double-touch gesture, and provide the user with a feedback. In this case, the digital device may set the valid recognition distance 32 with respect to the rear-side touch sensor unit to be longer than the valid recognition distance 22 with respect to the front-side touch sensor unit, thereby correcting a touch error caused when the user touches the rear side of the device.

Moreover, if the double-touch distance is within the valid recognition distance, the processor may further obtain a time interval between the first touch and the second touch, and determine whether or not the obtained time interval is within a valid recognition time interval. In the following description, the time interval between the first touch and the second touch may be referred to as a touch time interval.

Here, the valid recognition time interval refers to a maximum time interval required to recognize two touches within the valid recognition distance as a single valid double-touch gesture. The valid recognition time interval may be set upon manufacture of the digital device, or may be set by the user. In this case, the valid recognition time interval with respect to the rear-side touch sensor unit may be set to be equal to the valid recognition time interval with respect to the front-side touch sensor unit. Alternatively, the valid recognition time interval with respect to the rear-side touch sensor unit may be set to be longer or shorter than the valid recognition time interval with respect to the front-side touch sensor unit.

If the touch time interval is within the valid recognition time interval, the processor may recognize two touches within the valid recognition distance as a single valid double-touch gesture. If the touch time interval is outside the valid recognition time interval, the processor may recognize two touches within the valid recognition distance as separate touch inputs.

Figure 5A:
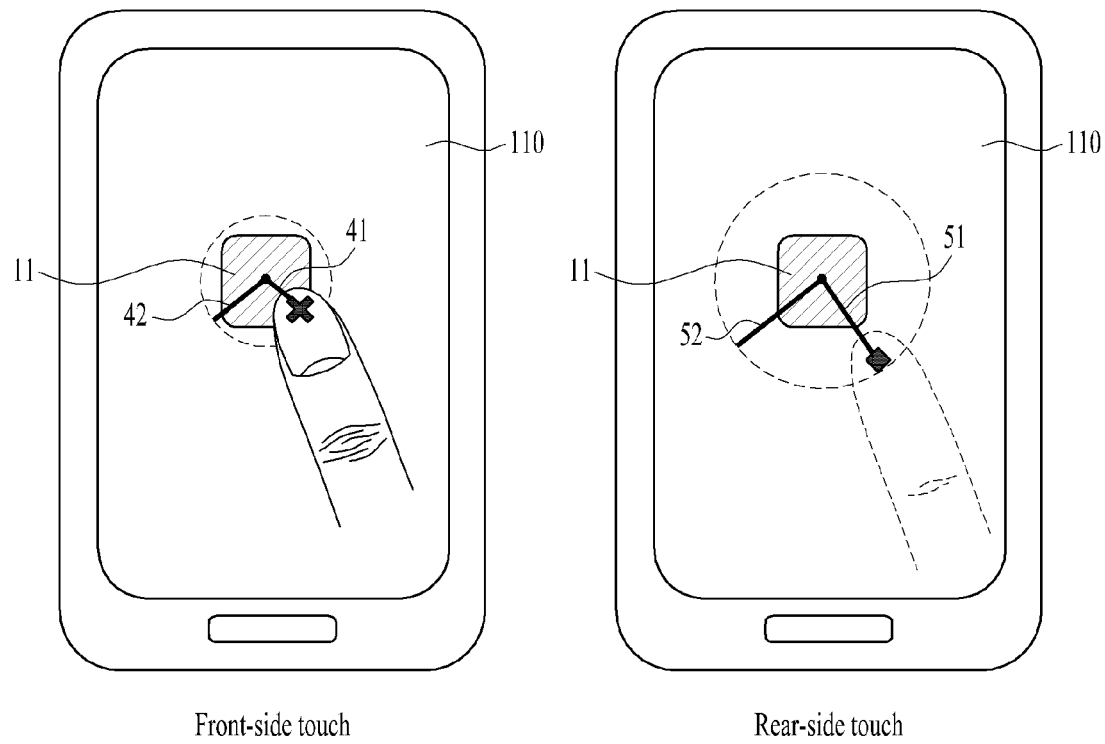
FIGS. 5A and 5B are views showing a digital device which is configured to recognize a touch input to a single visual object according to an embodiment of the present specification.
Figure 5B:
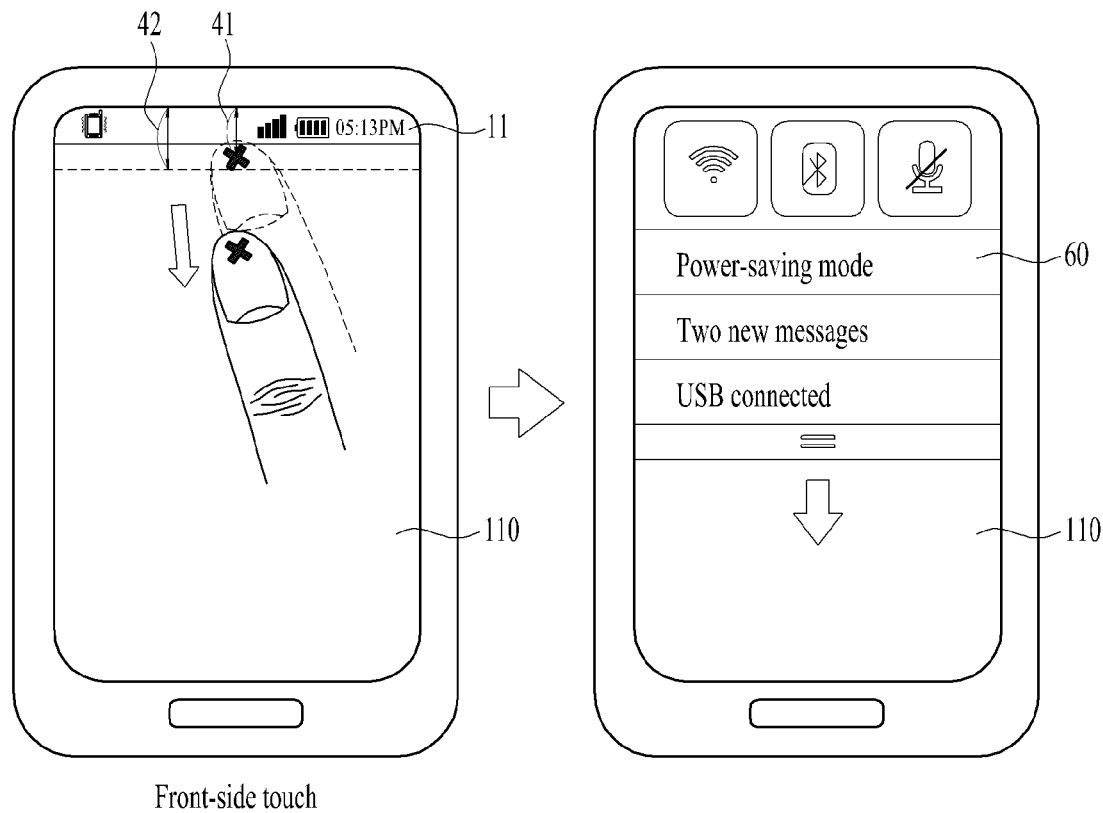
Figure 5B:
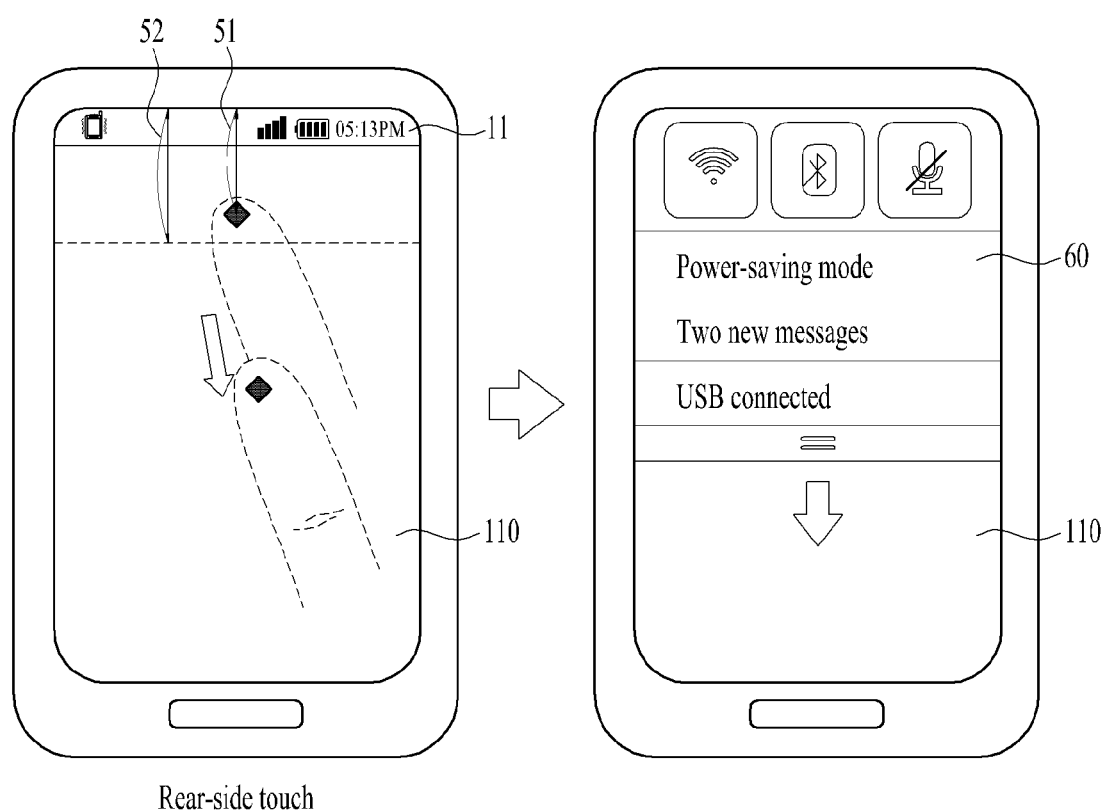

FIGS. 5A and 5B are views showing a digital device which is configured to recognize a touch input to a visual object according to an embodiment of the present specification. That is, FIGS. 5A and 5B show an embodiment in which a first reference position is a visual object position.

More specifically, FIG. 5A shows a digital device which is configured to recognize a touch input to a visual object if the visual object is an execution icon, and FIG. 5B shows a digital device which is configured to recognize a touch input to a visual object if the visual object is a status window.

Hereinafter, the present embodiment will be described in detail based on operation of the processor.

Referring to FIG. 5A, the processor may display the visual object 11 using the display unit 110. Here, the visual object may be an execution icon.

The processor may obtain a visual object position on a front-side touch sensor unit or a rear-side touch sensor unit. In one embodiment, the processor may obtain a visual object position after a touch input on the front-side touch sensor unit or a touch input on the rear-side touch sensor unit is sensed. In another embodiment, the processor may obtain a visual object position before a touch input on the front-side touch sensor unit or a touch input on the rear-side touch sensor unit sensed.

If the touch input on the front-side touch sensor unit or the touch input on the rear-side touch sensor unit is sensed, the processor may obtain a touch position from the touch input using a sensed result. Here, the touch position may be touch coordinate recognized from the touch input.

In addition, if the touch input on the front-side touch sensor unit or the touch input on the rear-side touch sensor unit is sensed, the processor may additionally obtain a touch area from the touch input, and determine whether or not the touch area is an area-threshold or more. In this case, an area-threshold with respect to the rear-side touch sensor unit may be set to be greater than an area-threshold with respect to the front-side touch sensor unit. In addition, if the touch area is the area-threshold or more, the processor may recognize the touch input as a valid touch input.

The processor may obtain a distance 41 or 51 between a visual object position and a touch position, and determine whether or not the obtained distance 41 or 51 is within a valid recognition distance 42 or 52. In the following description, the distance 41 or 51 between the visual object position and the touch position may be referred to as a single-touch distance.

Here, the valid recognition distance may refer to a maximum distance required to recognize a touch as a touch input to the visual object, the touch being also recognized as a touch position. That is, if the single-touch distance is within the valid recognition distance, the processor may recognize a touch as a touch input to the visual object, the touch being recognized as a touch position. The valid recognition distance may be set upon manufacture of the digital device, or may be set by the user. In this case, as exemplarily shown in FIG. 5A, the valid recognition distance 52 with respect to the rear-side touch sensor unit may be set to be longer than the valid recognition distance 42 with respect to the front-side touch sensor unit. In this way, the digital device may correct a touch error caused when the user touches the rear side of the device while maintaining the user gaze at the front side of the device.

If the single-touch distance is within the valid recognition distance, the processor may recognize a touch as a touch input to the visual object, the touch being also recognized as a touch position.

In addition, the processor may execute an application or function corresponding to the visual object. In other words, the processor may execute an application or function corresponding to an execution icon.

In summary, if the single-touch distance 41 with respect to the front-side touch sensor unit is within the valid recognition distance 42 as exemplarily shown in the left part of FIG. 5A, the processor may recognize a touch on the front side as a touch input to an execution icon. Or if the single-touch distance 51 with respect to the rear-side touch sensor unit is within the valid recognition distance 52 as exemplarily shown in the right part of FIG. 5A, the processor may recognize a touch on the rear side as a touch input to an execution icon. The digital device may execute an application or function corresponding to the execution icon. In this case, the digital device may set the valid recognition distance 52 with respect to the rear-side touch sensor unit to be longer than the valid recognition distance 42 with respect to the front-side touch sensor unit, thereby correcting a touch error caused when the user touches the rear side of the device. Although FIG. 5A shows that whether or not the single-touch distance is within the valid recognition distance is determined based on the visual object position, whether or not the single-touch distance is within the valid recognition distance may be determined based on the touch position.

Referring to FIG. 5B, the processor may display the visual object 11 using the display unit. Here, the visual object may be a status window.

If a touch input is sensed via the front-side touch sensor unit or the rear-side touch sensor unit, the processor may obtain a touch position from a touch input using a sensed result.

The processor may obtain the distance 41 or 51 between the visual object position and the touch position, and determine whether or not the obtained distance 41 or 51 between the visual object position and the touch position is within the valid recognition distance 42 or 52. As exemplarily shown in the left upper and lower parts of FIG. 5B, the distance 41 or 51 between the visual object position and the touch position may be a vertical distance between the status window and the touch position, and the valid recognition distance 42 or 52 may be a vertical distance between the status window and a shown dotted line. As described above, the distance 41 or 51 between the visual object position and the touch position may be referred to as a single-touch distance, and the valid recognition distance may have the same meaning as that defined in FIG. 5A.

If the single-touch distance 41 with respect to the front-side touch sensor unit is within the valid recognition distance 42 as exemplarily shown in the left upper part of FIG. 5B, or if the single-touch distance 51 with respect to the rear-side touch sensor unit is within the valid recognition distance 52 as exemplarily shown in the left lower part of FIG. 5B, the processor may recognize a touch at the front side or the rear side as a touch input to the status window. In this case, as exemplarily shown in FIG. 5B, the digital device may set the valid recognition distance 52 with respect to the rear-side touch sensor unit to be longer than the valid recognition distance 42 with respect to the front-side touch sensor unit, thereby correcting a touch error caused when the user touches the rear side of the device.

If a touch gesture to drag the status window downward is input, as exemplarily shown in the right upper/lower parts of FIG. 5B, the digital device may display a notification 60.

Figure 6A:
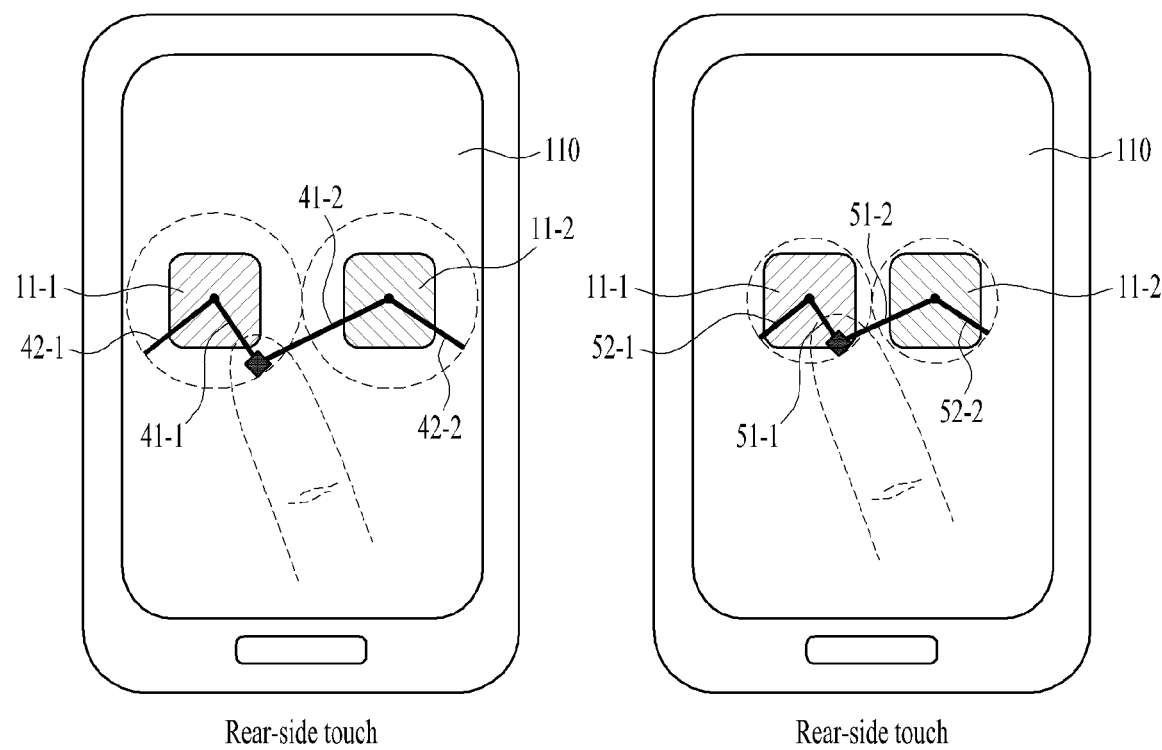
Figure 6C:
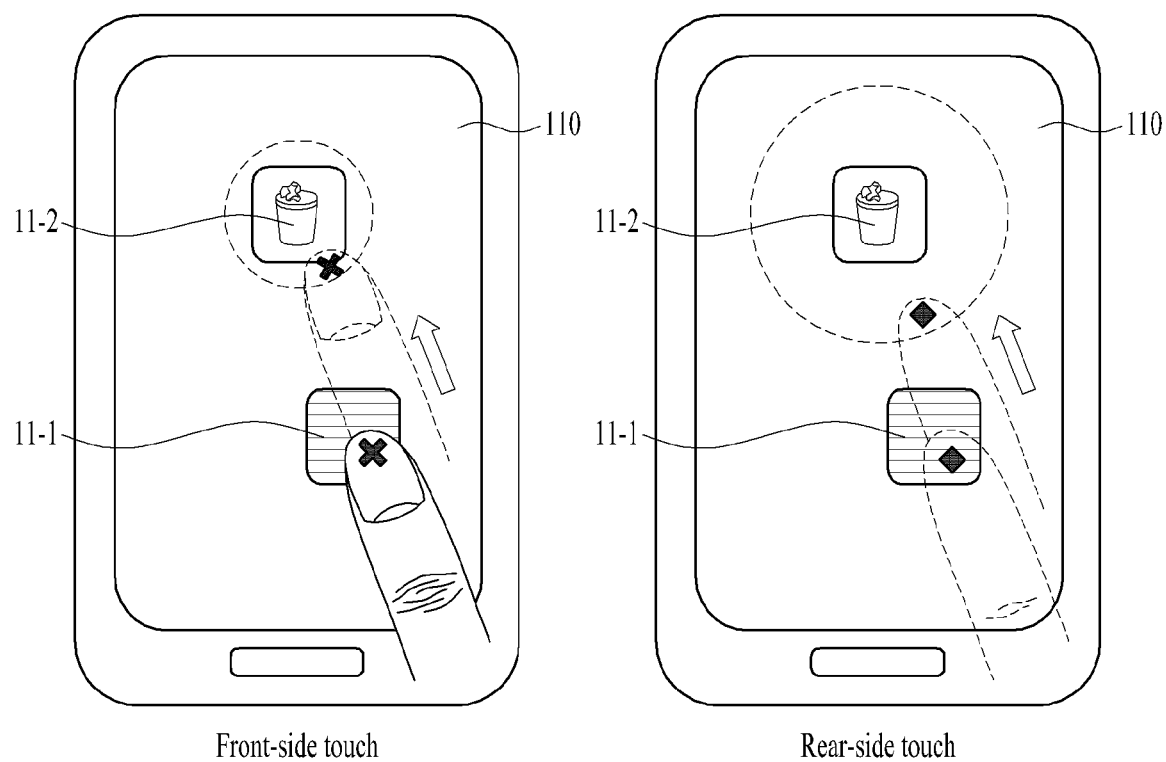

FIGS. 6A to 6C are views showing a digital device which is configured to recognize a touch input to any one of a plurality of visual objects according to an embodiment of the present specification. That is, FIGS. 6A to 6C show an embodiment in which a first reference position is a visual object position.

Hereinafter, the present embodiment will be described in detail based on operation of the processor.

Referring to FIG. 6A, the processor may display the plurality of visual objects 11-1 and 11-2 via the display unit. Here, the visual objects may be execution icons. In the following description, for convenience, although the plurality of visual objects will be described as including the first visual object 11-1 and the second visual object 11-2, the plurality of visual objects may include three or more visual objects.

The processor may obtain a first visual object position and a second visual object position via the front-side touch sensor unit or the rear-side touch sensor unit. In one embodiment, the processor may obtain the first visual object position and the second visual object position after sensing a touch input on the front-side touch sensor unit or the rear-side touch sensor unit. In another embodiment, the processor may obtain the first visual object position and the second visual object position before sensing a touch input on the front-side touch sensor unit or the rear-side touch sensor unit.

If a touch input is sensed using the front-side touch sensor unit or the rear-side touch sensor unit, the processor may obtain a touch position from the touch input using a sensed result.

Moreover, if a touch input is sensed using the front-side touch sensor unit or the rear-side touch sensor unit, the processor may additionally obtain a touch area from the touch input using the sensed result, and determine whether or not the touch area is an area-threshold or more. In this case, an area-threshold with respect to the rear-side touch sensor unit may be set to be greater than an area-threshold with respect to the front-side touch sensor unit. In addition, if a touch recognition area is the area-threshold or more, the processor may recognize a touch input as a valid touch input.

The processor may obtain a distance 41-1 or 51-1 between the first visual object position and the touch position, and determine whether or not the obtained distance 41-1 or 51-1 between the first visual object position and the touch position is within a first valid recognition distance 42-1 or 52-1. In addition, the processor may obtain a distance 41-2 or 51-2 between the second visual object position and the touch position, and determine whether or not the obtained distance 41-2 or 51-2 between the second visual object position and the touch position is within a second valid recognition distance 42-2 or 52-2. In the following description, the distance 41-1 or 51-1 between the first visual object position and the touch position may be referred to as a first single-touch distance, and the distance 41-2 or 51-2 between the second visual object position and the touch position may be referred to as a second single-touch distance. In addition, the first single-touch distance and the second single-touch distance may be referred to simply as a single-touch distance.

Here, each of the first and second valid recognition distances may refer to a maximum single-touch distance required to recognize a touch as a touch input to the first or second visual object, the touch being also recognized as a touch position. In this case, the first and second valid recognition distances may be set to the same valid recognition distance. The valid recognition distance may be set upon manufacture of the digital device, or may be set by the user.

In this case, the digital device may set the first and second valid recognition distances with respect to the front-side or rear-side touch sensor unit in consideration of each visual object position. For instance, the digital device may set the first valid recognition distance and the second valid recognition distance in consideration of each visual object position such that regions, recognized as touch inputs to the respective visual objects, do not overlap each other. That is, the digital device may set the first and second valid recognition distances to be longer when the respective visual objects are distant from each other as exemplarily shown in the left part of FIG. 6A than that when the respective visual objects are close to each other as exemplarily shown in FIG. 6B. In addition, the digital device may set the valid recognition distance to be shorter when the plurality of visual objects is displayed as exemplarily shown in FIG. 6A than that when the single visual object is displayed as exemplarily shown in FIG. 5A. In this way, regions, recognized as touch inputs to the respective visual objects, may not overlap each other. In addition, the digital device may set the first and second valid recognition distances with respect to the rear-side touch sensor unit to be longer than the first and second valid recognition distances with respect to the front-side touch sensor unit. In this way, it is possible to correct a touch error caused when the user touches the rear side of the device while maintaining the user gaze at the front side of the device.

If a visual object, the single-touch distance of which is within the valid recognition distance, is present, the processor may recognize a touch, recognized from a touch position, as a touch input to the corresponding visual object. For instance, as exemplarily shown in FIG. 6A, if the first single-touch distance 41-1 is within the first valid recognition distance 42-1 and the second single-touch distance 41-2 is within the second valid recognition distance 42-2, the first visual object 11-1, the single-touch distance of which is within the valid recognition distance, is present. Therefore, the processor may recognize a touch as a touch input to the first visual object 11-1, the touch being recognized as a touch position.

Moreover, a plurality of visual objects, the single-touch distance of each of which is within the valid recognition distance, may be present. This will hereinafter be described in detail with reference to FIG. 6B.

The processor may execute an application or function corresponding to the visual object at which a touch input is recognized.

Hereinafter, the case in which a plurality of visual objects, the single-touch distance of each of which is within the valid recognition distance, is present will be described with reference to FIG. 6B.

As exemplarily shown in the left part of FIG. 6B, the plurality of visual objects 11-1 and 11-2, a single-touch distance with respect to a first touch is within a valid recognition distance, may be present. That is, assuming that a distance between a first visual object position and a first touch position is within a first valid recognition distance, and a distance between a second visual object position and a second touch position is within a second valid recognition distance.

In this case, the processor may provide a visual feedback via the display unit as exemplarily shown in the center part of FIG. 6B. That is, the processor may provide a visual feedback to recognize a first touch as a touch input to a single visual object. In this case, the processor may provide a text message and a visual feedback that displays changed positions of the first visual object 11-1 and the second visual object 11-2. For instance, the processor may provide a text message "Retouch a visual object to be executed" and a visual feedback that displays changed positions of the first visual object 11-1 and the second visual object 11-2 for clear discrimination of the respective objects via the display unit. In this way, the user may visually perceive the text message and the visual feedback, and accurately retouch the visual object to be executed. Moreover, the processor may reset the first valid recognition distance and the second valid recognition distance to be longer, in addition to providing the visual feedback.

As exemplarily shown in the right part of FIG. 6B, if a second touch input to the second visual object 11-2 to be executed is recognized, the processor may execute an application or function corresponding to the second visual object 11-2 at which the second touch input is recognized.

FIG. 6C shows a digital device which is configured to recognize a touch input to a visual object if the visual object includes a recycle bin icon according to an embodiment.

As exemplarily shown in FIG. 6C, the first visual object 11-1 may be an execution icon to be deleted, and the second visual object 11-2 may be a recycle bin icon having a recycle bin function to delete other icons.

In this case, if the first visual object 11-1 is dragged to a position of the second visual object 11-2 by a user touch input, the processor may determine whether or not a distance between a second visual object position and a final touch position is within a valid recognition distance. Here, to delete the execution icon, the user may select the first visual object 11-1 via a long press touch gesture, and move the selected first visual object 11-1 to a position of the second visual object 11-2 via a drag touch gesture.

In addition, if the distance between the second visual object position and the final touch position is within the valid recognition distance, the processor may recognize a touch as a touch input to the second visual object 11-2, the touch being also recognized as the final touch position.

The processor may delete the first visual object 11-1 dragged to the second visual object 11-2 by executing an icon deletion function corresponding to the second visual object 11-2. In this case, the digital device may set a valid recognition distance with respect to the rear-side touch sensor unit to be longer than a valid recognition distance with respect to the front-side touch sensor unit, thereby correcting a touch error caused when the user touches the rear side of the device.

Figure 7:
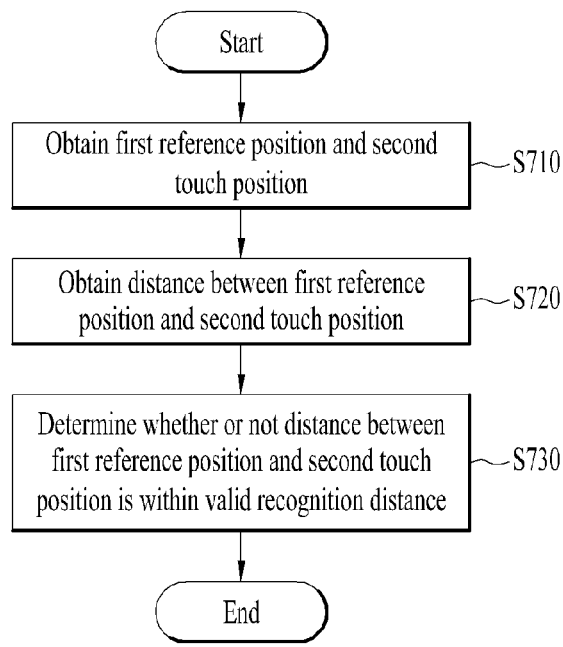
FIG. 7 is a flowchart showing a control method of a digital device according to an embodiment of the present specification.

FIG. 7 is a flowchart showing a control method of a digital device according to an embodiment of the present specification.

Referring to FIG. 7, the digital device may obtain a first reference position and a second position on the front-side touch sensor unit or the rear-side touch sensor unit (S710). In one embodiment, the first reference position may be a first touch position. This will hereinafter be described in detail with reference to FIG. 8. In another embodiment, the first reference position may be a visual object position. This will hereinafter be described in detail with reference to FIG. 9.

Next, the digital device may obtain a distance between the first reference position and the second touch position (S720).

Next, the digital device may determine whether the distance between the first reference position and the second touch position is within a valid recognition distance (S730). In this case, as described above with reference to FIGS. 4 to 6C, the digital device may set a valid recognition distance with respect to the rear-side touch sensor unit to be longer than a valid recognition distance with respect to the front-side touch sensor unit. In this way, the digital device may correct a touch error caused when the user touches the rear side of the device while maintaining the user gaze at the front side of the device.

Figure 8:
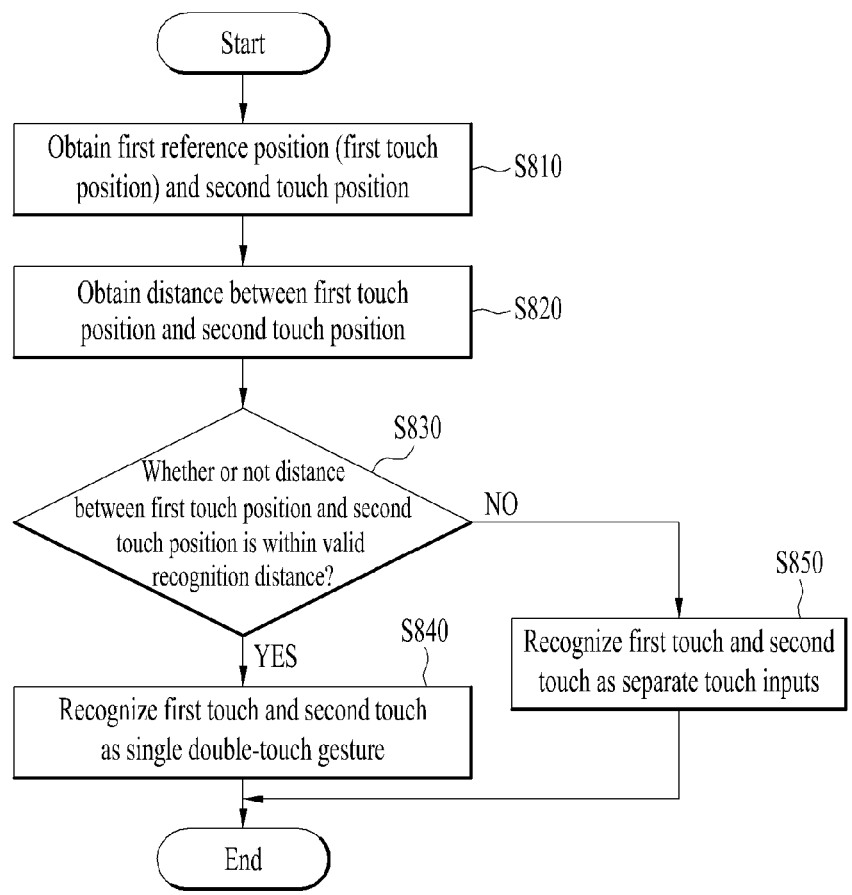
FIG. 8 is a flowchart showing a control method of a digital device when a first reference position is a first touch position according to an embodiment of the present specification.

FIG. 8 is a flowchart showing a control method of a digital device when a first reference position is a first touch position according to an embodiment of the present specification.

Referring to FIG. 8, the digital device may obtain a first touch position and a second touch position on the front-side touch sensor unit or the rear-side touch sensor unit (S810). In this case, the digital device may obtain the first touch position and the second touch position using the above-described method of FIG. 4.

Next, the digital device may obtain a distance between the first touch position and the second touch position (S820).

Next, the digital device may determine whether a distance between the first touch position and the second touch position is within a valid recognition distance (S830). Here, as described above with reference to FIG. 4, the valid recognition distance refers to a maximum distance required to recognize two touches as a single valid double-touch gesture. The valid recognition distance may be set upon manufacture of the digital device, or may be set by the user. In this case, the digital device may set a valid recognition distance with respect to the rear-side touch sensor unit to be longer than a valid recognition distance with respect to the front-side touch sensor unit. Thereby, it is possible to correct a touch error caused when the user touches the rear side of the device while maintaining the user gaze at the front side of the device.

Next, if the distance between the first touch position and the second touch position is within the valid recognition distance, the digital device may recognize a first touch and a second touch as a single double-touch gesture, the first touch being recognized as a first touch position, and the second touch being recognized as a second touch position (S840). In addition, if the distance between the first touch position and the second touch position is outside the valid recognition distance, the digital device may recognize the first touch and the second touch as separate touch inputs (S850).

Next, if the first touch and the second touch are recognized as a single double-touch gesture, the processor, as described above with reference to FIG. 4, may provide at least one of a visual feedback, an audio feedback, or a tactile feedback.

In addition, if the distance between the first touch position and the second touch position is within the valid recognition distance, the digital device, as described above with reference to FIG. 4, may additionally obtain a time interval between the first touch and the second touch, and determine whether or not the obtained time interval between the first touch and the second touch is within a valid recognition time interval. In addition, if the time interval between the first touch and the second touch is within the valid recognition time interval, the digital device may recognize the first touch and the second touch as a single double-touch gesture. In addition, if the time interval between the first touch and the second touch is outside the valid recognition time interval, the digital device may recognize the first touch and the second touch as separate touch inputs even when the distance between the first touch position and the second touch position is within the valid recognition distance. In this case, the digital device may set the valid recognition time interval with respect to the rear-side touch sensor unit to be equal to the valid recognition time interval with respect to the front-side touch sensor unit.

Figure 9:
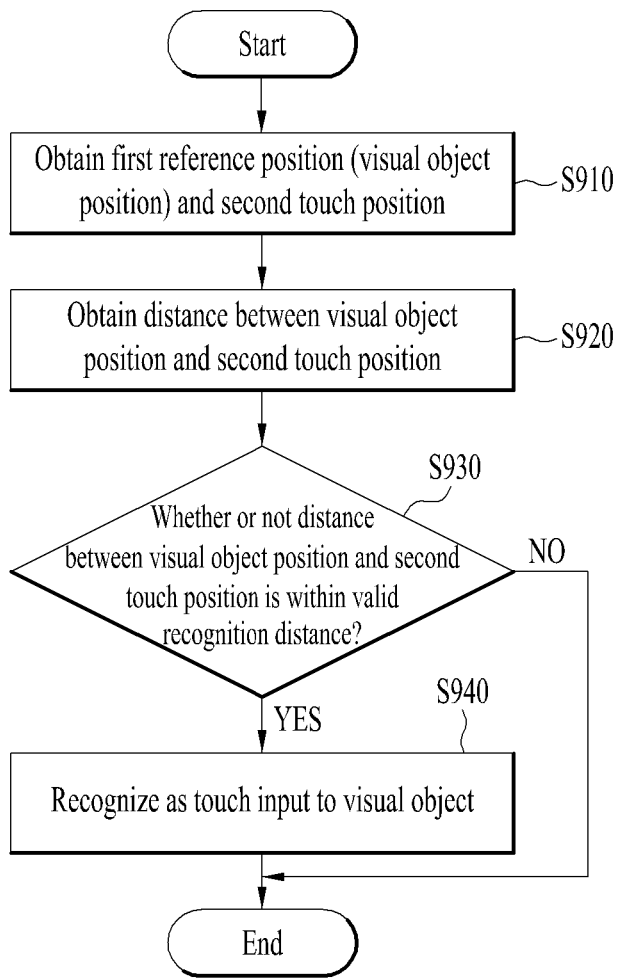
FIG. 9 is a flowchart showing a control method of a digital device when a first reference position is a visual object position according to an embodiment of the present specification.

FIG. 9 is a flowchart showing a control method of a digital device when a first reference position is a visual object position according to an embodiment of the present specification.

Referring to FIG. 9, the digital device may obtain a visual object position and a second touch position on the front-side touch sensor unit or the rear-side touch sensor unit (S910). Here, the visual object may be an execution icon or a status window. In this case, the digital device may obtain the visual object position and the second touch position using the above-described method with reference to FIGS. 5A to 6C.

Next, the digital device may obtain a distance between the visual object position and the second touch position (S920).

Next, the digital device may determine whether or not a distance between the visual object position and the second touch position is within a valid recognition distance (S930). Here, the valid recognition distance, as described above with reference to FIGS. 5A to 6C, refers to a maximum distance required to recognize a touch as a touch input to a visual object, the touch being also recognized as a touch position. The valid recognition distance may be set upon manufacture of the digital device, or may be set by the user. In this case, the digital device may set the valid recognition distance with respect to the rear-side touch sensor unit to be longer than the valid recognition distance with respect to the front-side touch sensor unit. Thereby, it is possible to correct a touch error caused when the user touches the rear side of the device while maintaining the user gaze at the front side of the device.

Next, if the distance between the visual object position and the second touch position is within the valid recognition distance, the digital device may recognize a touch as a touch input to the visual object (S940), the touch being also recognized as the touch position. In this case, the digital device may recognize the touch as the touch input to the visual object using the method as described above with reference to FIGS. 5A to 6C.

Next, if a user touch is recognized as the touch input to the visual object, the digital device may execute an application or function corresponding to the visual object. In this case, the digital device may execute an application or function corresponding to the visual object as described above with reference to FIGS. 5A to 6C.

As is apparent from the above description, according to an embodiment, a display device may set a valid recognition distance with respect to a rear-side touch sensor unit to be longer than a valid recognition distance with respect to a front-side touch sensor unit, thereby correcting a touch error caused by double touches to a rear side of the device. In addition, it is possible to correct a touch error caused upon controlling operation of a visual object displayed at a front side of the device using a rear-side touch.

In addition, when a rear-side touch to select one of a plurality of visual objects displayed at the front side of the device is input, the display device may provide the user with a visual feedback, thereby correcting a touch error caused upon controlling operation of the plurality of visual objects using the rear-side touch.

Although the respective drawings have been described individually for convenience, the embodiments described in the respective drawings may be combined to realize novel embodiments. In addition, designing a computer readable recording medium in which a program to execute the above-described embodiments is recorded according to a need of those skilled in the art is within the scope of the disclosure.

In addition, the digital device and the control method thereof are not limited to the configurations and methods of the above described embodiments, and all or some of the embodiments may be selectively combined to achieve various modifications.

Moreover, the digital device and the control method thereof according to the present disclosure may be implemented as code that may be written on a processor readable recording medium and thus read by a processor provided in a network device. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

In addition, the disclosure describes both a device invention as well as a method invention, and descriptions of both inventions may be complementarily applied as needed.

What is claimed is:
1. A digital device comprising:
a display configured to display at least one visual object;

a front-side touch sensor configured to sense a touch input on a front side of the digital device;
a rear-side touch sensor configured to sense a touch input on a rear side of the digital device; and
a processor configured to control the display, the front-side touch sensor, and the rear-side touch sensor,
wherein the processor is further configured to:
obtain a first reference position and a second touch position on the front-side touch sensor or the rear-side touch sensor, wherein the first reference position is a first touch position,
obtain a distance between the first reference position and the second touch position,
determine whether or not the distance between the first reference position and the second touch position is within a valid recognition distance, wherein the valid recognition distance corresponds to a maximum distance required to recognize two touches, and wherein the valid recognition distance with respect to the rear-side touch sensor is longer than the valid recognition distance with respect to the front-side touch sensor, and
if the distance between the first reference position and the second touch position is within the valid recognition distance, recognize a first touch and a second touch as a single double-touch gesture, and
if the distance between the first reference position and the second touch position is outside the valid recognition distance, recognize the first touch and the second touch as separate touch inputs.

2. The digital device according to claim 1, wherein the processor is further configured to:
if the distance between the first reference position and the second touch position is within the valid recognition distance, obtain a time interval between the first touch and the second touch and determine whether or not the time interval is within a valid recognition time interval, and
recognize the first touch and the second touch as the single double-touch gesture when the time interval is within the valid recognition time interval or as the separate touch inputs when the time interval is outside the valid recognition time interval.

3. The digital device according to claim 2, wherein the valid recognition time interval with respect to the rear-side touch sensor is equal to the valid recognition time interval with respect to the front-side touch sensor.

4. The digital device according to claim 1, wherein the first reference position is a position of a first visual object, and
wherein if the distance between the first reference position and the second touch position is within a first valid recognition distance of the first visual object, the processor is further configured to recognize a second touch as a touch input to the first visual object, the second touch being recognized as the second touch position.

5. The digital device according to claim 4, wherein the processor is further configured to:
obtain a second reference position on the front-side touch sensor or the rear-side touch sensor, the second reference position being a position of a second visual object,
obtain a distance between the second reference position and the second touch position,
determine whether or not the distance between the second reference position and the second touch position is within a second valid recognition distance of the second visual object, and
if the distance between the second reference position and the second touch position is within the second valid recognition distance, recognize the second touch as a touch input to the second visual object.

6. The digital device according to claim 5, wherein the first valid recognition distance and the second valid recognition distance are equal to each other.

7. The digital device according to claim 5, wherein the processor is further configured to set the first valid recognition distance and the second valid recognition distance based on the positions of the first visual object and the second visual object.

8. The digital device according to claim 5, wherein if the distance between the first reference position and the second touch position is within the first valid recognition distance and the distance between the second reference position and the second touch position is within the second valid recognition distance, the processor is further configured to provide a visual feedback for recognition of the second touch as the touch input to one visual object among the first visual object and the second visual object.

9. The digital device according to claim 1, wherein the processor is further configured to:
obtain a touch area from the touch input on the front-side touch sensor or the rear-side touch sensor, and
determine whether or not the touch area is an area-threshold, and
wherein the area-threshold with respect to the rear-side touch sensor is greater than the area-threshold with respect to the front-side touch sensor.

10. The digital device according to claim 9, wherein the processor is further configured to recognize the touch input as a valid touch when the touch area is the area-threshold or more.

11. The digital device according to claim 1, wherein the front-touch sensor and the rear-side touch sensor consist of a single sensor.

12. A control method of a digital device, the method comprising:
obtaining a first reference position and a second touch position on a front-side touch sensor or a rear-side touch sensor, wherein the first reference position is a first touch position;
obtaining a distance between the first reference position and the second touch position; and
determining whether or not the distance between the first reference position and the second touch position is within a valid recognition distance,
wherein the valid recognition distance corresponds to a maximum distance required to recognize two touches, and
wherein the valid recognition distance with respect to the rear-side touch sensor is longer than the valid recognition distance with respect to the front-side touch sensor, and
if the distance between the first reference position and the second touch position is within the valid recognition distance, recognizing a first touch and a second touch as a single double-touch gesture, and
if the distance between the first reference position and the second touch position is outside the valid recognition distance, recognizing the first touch and the second touch as separate touch inputs.

13. The control method according to claim 12, further comprising:
obtaining if the distance between the first reference position and the second touch position is within the valid recognition distance, obtaining a time interval between the first touch and the second touch and determining whether or not the time interval is within a valid recognition time interval, recognizing the first touch and the second touch as a single double-touch gesture if the time interval is within the valid recognition time interval, and recognizing the first touch and the second touch as separate touch inputs if the time interval is outside the valid recognition time interval.

14. The control method according to claim 13, wherein the valid recognition time interval with respect to the rear-side touch sensor unit is equal to the valid recognition time interval with respect to the front-side touch sensor unit.

15. The control method according to claim 12, wherein the first reference position is a position of a visual object, further comprising:

recognizing a second touch as a touch input to the visual object if the distance between the first reference position and the second touch position is within the valid recognition distance, the second touch being recognized as the second touch position.

16. A digital device comprising:

a display configured to display a visual object;

a front-side touch sensor configured to sense a touch input on a front side of the digital device;

a rear-side touch sensor configured to sense a touch input on a rear side of the digital device; and a processor configured to control the display, the front-side touch sensor, and the rear-side touch sensor, wherein the processor is further configured to:

recognize a first touch and a second touch, obtained via one touch sensor among the front-side touch sensor or the rear-side touch sensor, as a single double-touch gesture or as separate touch inputs according to position and time of the first touch and the second touch, if a distance between positions of the first touch and the second touch is within a valid recognition distance and a time interval between the first touch and the second touch is within a valid recognition time interval, recognize the first touch and the second touch as the single double-touch gesture, wherein the valid recognition distance corresponds to a maximum distance required to recognize two touches, and wherein the valid recognition distance with respect to the rear-side touch sensor is longer than the valid recognition distance with respect to the front-side touch sensor, and if the distance between positions of the first touch and the second touch is outside the valid recognition distance and the time interval between the first touch and the second touch is outside the valid recognition time interval, recognize the first touch and the second touch as the separate touch input.

17. The digital device according to claim 16, wherein the valid recognition time interval with respect to the rear-side touch sensor is equal to the valid recognition time interval with respect to the front-side touch sensor.

18. The digital device according to claim 16, wherein the front-touch sensor and the rear-side touch sensor consist of a single sensor.

* * * * *